United States Patent [19]

Mahler

[11] Patent Number: 4,574,741
[45] Date of Patent: Mar. 11, 1986

[54] PORTABLE VEHICLE MOUNTED STANCHION

[76] Inventor: Bob Mahler, P.O. Box 393, Falls City, Oreg. 97344

[21] Appl. No.: 569,318

[22] Filed: Jan. 9, 1984

[51] Int. Cl.[4] .............................................. A61D 3/00
[52] U.S. Cl. .................................. 119/98; 119/147 R
[58] Field of Search ....................... 119/98, 99, 147 R

[56] References Cited

U.S. PATENT DOCUMENTS

| | | | |
|---|---|---|---|
| 1,363,054 | 12/1920 | Poppenga, Jr. | 119/98 |
| 1,427,274 | 8/1922 | Evers | 119/99 |
| 1,574,828 | 3/1926 | Lucas | 119/99 |
| 2,441,996 | 5/1948 | Fairchild | 119/98 |
| 2,698,601 | 1/1955 | Pfullman | 119/98 |
| 2,778,334 | 1/1957 | Moore | 119/98 |
| 3,473,518 | 10/1969 | Heldenbrand | 119/98 |
| 3,513,812 | 5/1970 | Iverson et al. | 119/98 |

Primary Examiner—Robert P. Swiatek
Attorney, Agent, or Firm—Charles N. Hilke

[57] ABSTRACT

A portable vehicle mounted stanchion comprising a main stanchion frame to which a vertical adjustment arm is pivotably connected. The vertical adjustment arm may also be pivoted through different adjustment holes in the main stanchion frame to accommodate different animals. Two mounting brackets are bolted to the rear bumper of a vehicle, generally a pickup truck, where said mounting brackets contain vertical adjustment holes through which bolts and quick detach pins join to the stanchion frame through pivot holes. Release of the quick detach pins allows the main stanchion frame to pivot about the bolts and rest horizontally on the bed of the pickup truck.

1 Claim, 4 Drawing Figures

PORTABLE VEHICLE MOUNTED STANCHION

BACKGROUND OF INVENTION

This invention relates in general to stanchions. Stanchions are combinations of materials arranged so that an animal's head can effectively be held while the animal is being treated or groomed. The animal is standing on the ground and is immobilized by having its head held in the stanchion. Disadvantages of conventional stanchions are weight, non-portability and, all maintain a singular position when not in use. In an effort to overcome certain shortcomings and to improve aspects of stanchion designs, the following list of patents disclose design features which have been conceived:

| U.S. Pat. No. | Patentee | Issue Date |
| --- | --- | --- |
| 2,997,982 | George P. Trogdon | Oct. 28, 1959 |
| 3,371,653 | John R. Anderson | March 5, 1968 |
| 3,511,216 | Elton L. George | May 12, 1970 |

While some of the above listed patents provide for the holding of an animal's head, none of the above listed patents provide means by which the stanchion may be folded down when not in use. Nor do the above patents exhibit the new and useful advantage of mounting the stanchion to a vehicle. A rope cleat adds to the utility of the present invention by allowing the user to better immobilize an animal. Also, this stanchion's construction makes for ease of use through simplicity not found in prior stanchion devices.

SUMMARY OF THE INVENTION

A stanchion that is secured to a vehicle with fold-down capabilities characterized by a multi-position adjustable swing-arm, frame, instant chain catch, integral mounting brackets, swing-arm guides and chain guide loop. It is an object of this invention to provide ranchers, veterinarians, groomers, animal husbandry specialists, animal caretakers and showpersons with a stanchion that is inexpensive yet ruggedly built.

Another object of the present invention is to provide a stanchion that, when mounted to a vehicle, arrives ready for service when there is work to be done.

Another object of the present invention is to provide a stanchion that readily folds down and out of the way when not in use.

A further object of the present invention is to provide a stanchion that can quickly be removed from the vehicle and transferred to another vehicle or a permanently stationary anchored housing.

The objects stated for the present invention, and further objects and scope of the present invention, will become apparent from the detailed description given hereafter.

DETAILED DESCRIPTION OF THE PREFERRED EMBODIMENT

Figure 1:
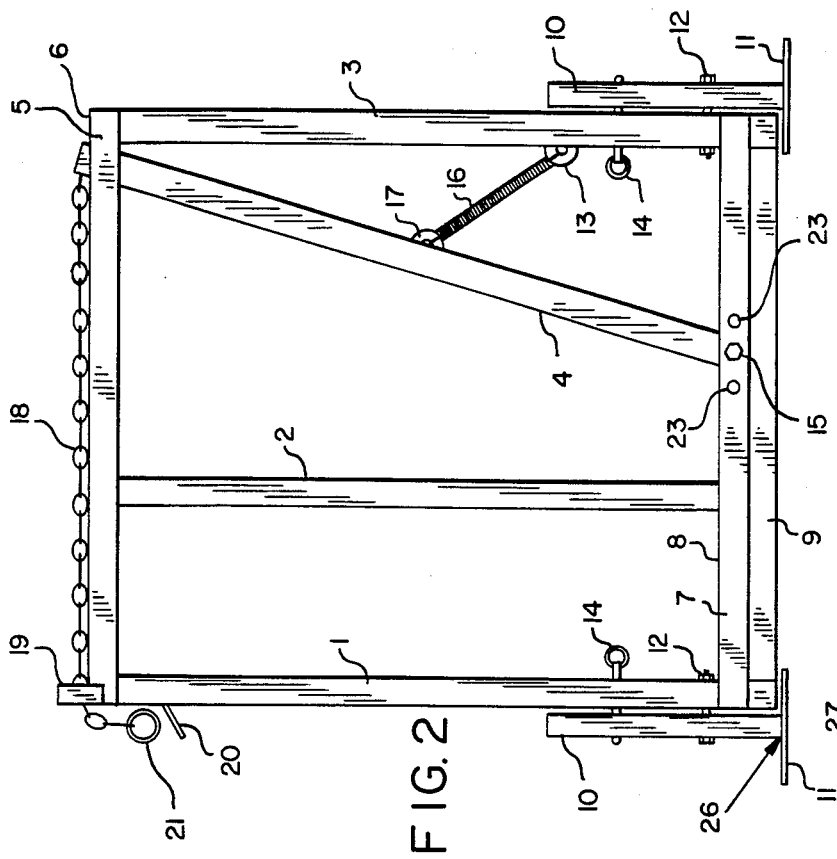
FIG. 1 shows the portable stanchion of the present invention in the closed position.

More specifically, the portable vehicle mounted stanchion 25 of the present invention comprises a main stanchion frame 24 consisting of vertical support members 1, 2, and 3 substantially parallel to one another but spaced apart and secured permanently at their top and bottom by horizontal support members 5, 6, 7, 8, and 9. The horizontal support members 7 and 8 contain three arm adjustment holes 23 (see FIG. 2). The vertical adjustable arm 4 is housed between horizontal support members 5, 6, 7, and 8 and is attached by means of arm pivot pin 15 through arm adjustment hole 23 in horizontal support members 7 and 8 at vertical adjustment arm 4 base to allow the pivotal opening and closing of the adjustable arm 4. That portion of the horizontal support members 5 and 6 that lies between vertical support members 2 and 3 act as a guide for the top portion of the adjustable arm 4.

Figure 4:
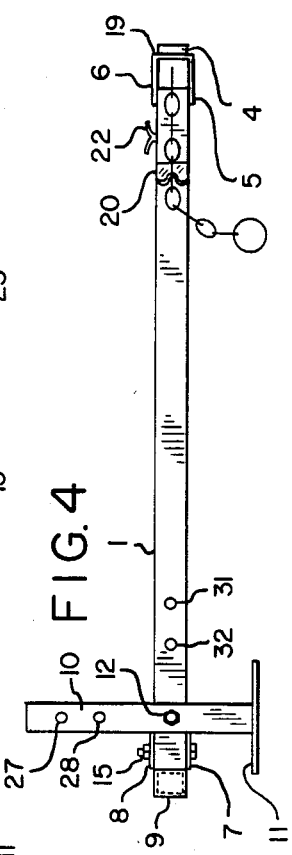
FIG. 4 shows a profile or side view of the portable stanchion of the present invention in its folded down configuration.
Figure 3:
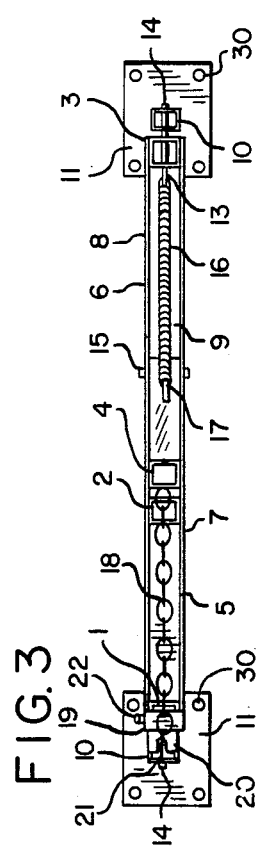
FIG. 3 shows a top view of the portable stanchion of the present invention.

The vertical upright 10 of the mounting bracket 26 is adjoined to the horizontal base 11. The vertical upright 10 contains vertical adjustment holes 27 and 28 to allow for the horizontal pivot adjustment heights of the main stanchion frame 24 to suit various truck bed heights. This allows the configuration of the portable vehicle mounted stanchion 25 as represented in FIG. 4. The horizontal base 11 contains bolt holes 30 which, as represented in FIG. 3, allow for the installation of the portable vehicle mounted stanchion 25 on a vehicle bumper or other object.

The vertical adjustment holes 27 and 28 in the vertical upright 10 align with the pivot holes 31 and 32 in the vertical support members 1 and 3. Bolts 12 and quick detach pins 14 pass through the aligned holes 27 and 28 of the vertical uprights 10 and continue through pivot holes 31 and 32 of the vertical support members 1 and 3, and are interchangeable to allow for adjustable pivot height.

Half moon spring anchor 13 is attached to the inside of vertical support member 3. The corresponding half moon spring anchor 17 is attached to the vertical adjustable arm 4. Tension spring 16 attaches to and between half moon spring anchors 13 and 17 and causes the vertical adjustable arm 4 to open when the multi-position pull chain 18 is released from the quick-release chain catch 20.

The pull chain 18 is attached to the uppermost portion of the vertical adjustable arm 4 and passes through a pull chain guide 19 and culminates with a handle 21. The chain catch 20 is of semi-slotted design and allows the user multi-positioning of the vertical adjustable arm 4 by positioning and securing links of the pull chain 18 in an extraordinarily efficient and smooth manner. By pulling downward and slightly outward on the handle 21 the pull chain disengages from the chain catch 20 and affords a quick release of an animal'head by the automatic action of the tension spring 16 pulling the vertical adjustable arm 4 to one side thereby increasing the opening and allowing the animal to back its head out of the portable vehicle mounted stanchion 25.

Figure 2:
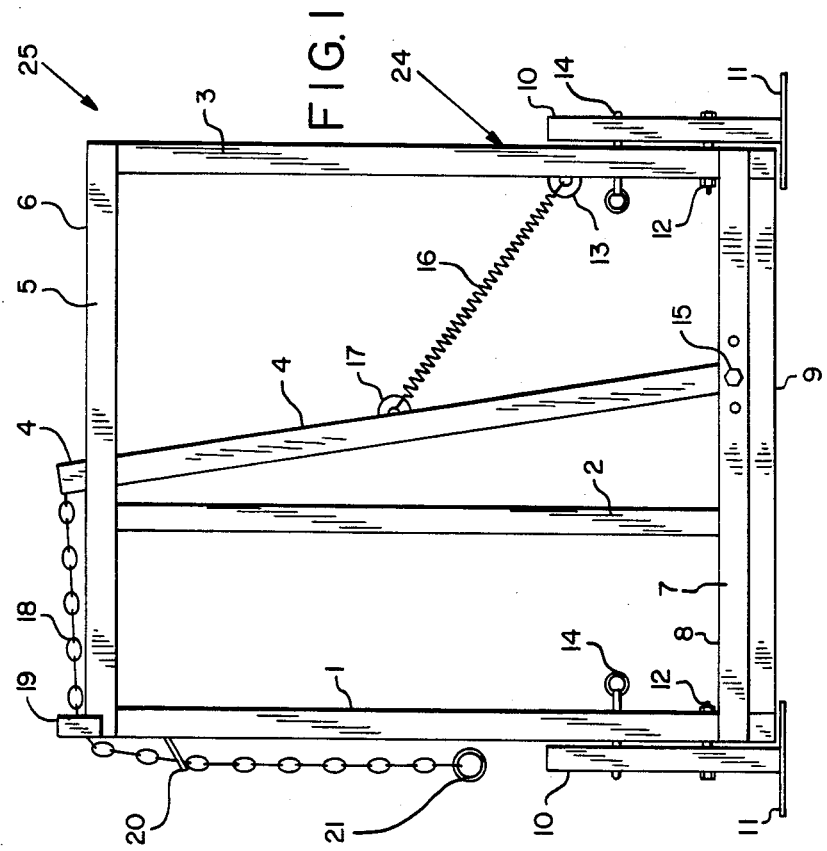
FIG. 2 shows the portable stanchion of the present invention in the open position.

The rope cleat 22 (FIG. 4) is attached to the upper rear of vertical support member 1 and is utilized after an animal's head is secured in the portable vehicle mounted stanchion 25. An animal may be secured by placing the animal's head through the opening between the vertical support member 2 and the vertical adjustable arm 4 as shown in FIG. 2. The vertical adjustable arm 4 is then pulled to the closed position as seen in FIG. 1. An animal can then be better immobilized by placing a rope or cord around the animal's neck and while pulling the animal's head up and to the side of the vertical support member 1 the rope or cord may then be looped through the rope cleat 22. The animal is thus secured and its head immobilized to better facilitate handling and/or treatment.

The arm pivot pin 15 may be moved to one of the arm adjustment holes 23 located in the horizontal support members 7 and 8 which allows for an increased or decreased opening between the vertical support member 2 and the vertical adjustable arm 4. The adjustable nature of the portable vehicle mounted stanchion 25 enables broader range of use on a wider assortment of animals.

The portable vehicle mounted stanchion 25 is designed to be mounted to a vehicle. This may be accomplished by drilling holes in the rear bumper that correspond with the bolt holes 30 located in the horizontal base 11. Bolts are then passed through the bolt holes 30, through the bumper and fastened with nuts.

When in use, the portable vehicle mounted stanchion 25 of the present invention appears as represented in FIG. 1 and FIG. 2. When the portable vehicle mounted stanchion 25 of the presented invention is not in use, the user may fold down the portable vehicle mounted stanchion 25 in the bed of the truck by simply sliding out the quick detach pins 14 from the corresponding pivot holes 31 and 32 and allowing the portable vehicle mounted stanchion 25 to fold down as represented in FIG. 4. The quick detach pins 14 and bolts 12 may be fully removed (not shown) and the portable vehicle mounted stanchion 25 may be easily moved and mounted quickly to another vehicle or location. Only a set of mounting brackets 26, would be needed to effectuate the transfer.

The portable vehicle mounted stanchion 25 of the present invention is provided as an assembled unit. The invention is constructed of square metal tubing for maximum strength and durability. When constructed of square tubing the stationary parts are attached by welding.

From the preceding detailed invention description it can be seen that the present invention has been developed to offer a stanchion design suitable for mounting on a vehicle and one that may be conveniently and quickly folded down or removed and reinstalled at another location as the user wishes. The opening and closing mechanism of the present invention provides for a stanchion with instant adjustable opening widths. The present invention can be economically produced and has a wide range of uses for ranches, farms, dairies, animal feed lots, zoos, veterinary particles and educational facilities and at state, county and local fairs, plus numerous other applications.

The invention may be varied in many ways and preferred embodiments have been illustrated in the drawings and specific terms used in the description. Variations, specific illustrations, and detailed descriptions are used in a broad sense and are not intended to limit the scope of the invention.

The scope of the present invention is included in the following claims:

I claim:

1. A portable vehicle mounted stanchion comprising:
   a main stanchion frame of at least two vertical support members fixably attached to at least two horizontal support members;
   a vertical adjustable arm pivotably attached to said main stanchion frame where said vertical adjustment arm can be adjusted to pivot about a plurality of arm adjustment holes;
   a pull chain fixably attached to said vertical adjustable arm and removeably attachable at a plurality of positions to a chain catch;
   a tension spring fixably attached to said main stanchion frame and said vertical adjustment arm;
   at least one mounting bracket of a horizontal base fixably attached to a vertical upright, where said horizontal base has bolt holes for securing said at least one mounting bracket, where said vertical upright has vertical adjustment holes, and where said main stanchion frame is adjustably and pivotably attachable to said vertical upright of said at least one mounting bracket by alignment of said vertical adjustment holes of said vertical upright with pivot holes of said vertical support member.

* * * * *